Jan. 24, 1967 V. GEWIRC ETAL 3,299,725
QUICK ACTING TOOL FOR THREADED FASTENERS
Filed Sept. 12, 1963 2 Sheets-Sheet 1

INVENTORS
VLADISLAV GEWIRC
MOSHEH SHACHTER

INVENTORS
VLADISLAV GEWIRC
MOSHEH SHACHTER

3,299,725
QUICK ACTING TOOL FOR THREADED FASTENERS

Vladislav Gewirc, Kiriat Ono, Israel (19339 Schaefer, Detroit, Mich. 48235); and Mosheh Shachter, 58 Blum, Holon, Israel
Filed Sept. 12, 1963, Ser. No. 309,374
1 Claim. (Cl. 74—157)

This invention relates to manually operated tool for setting and removing threaded fasteners which may have various embodiments as for instance: wrench, screwdriver.

The process of setting (fastening) various kinds of threaded fasteners, as for instance: bolts, screws, studs, nuts, consists in main of two parts: running and tightening.

The process of removing the threaded fasteners also comprises two parts: loosening and running. When manually operated tools are used for setting and removing the threaded fasteners, the running of the fastener usually takes a lot of time during which only a small part of the operator's power is used, while the tightening or loosening demands a big force during comparatively short period of time.

In order to do the job more efficiently, manually operated tool for setting and removing the threaded fasteners should comprise a transmission with two transmission ratios, and means for variation of the transmission ratio. During the period of running the fastener, when the resistance is small, the said transmission enables one to run the fastener with a high sped, and for the period of tightening or loosening the transmission ratio varies and the transmission produces a bigger force sufficient for the tightening and loosening. It should be noted that sometimes the transmission may have more than two transmission ratios but usually it is enough to have two speeds.

The tool comprises some driving member as for instance the handle of the wrench or the handle of the screwdriver, and some driven member, as for instance the socket of the wrench or the bit of the screwdriver.

The input member of the transmission is coupled with the driving member.

The output member of the transmission is coupled with the driven member.

The reaction member of the transmission is stopped either by the operator or otherwise.

One of the simplest solutions is to use the transmission ratio 1:1 for tightening and loosening. In this case the transmission may have only one speed increase transmission ratio which is used for running while for the period of tightening and loosening, some members of the transmission are blocked together and thus the transmission ratio 1:1 is realized. For instance, the input member of the transmission can be directly coupled with the output member (for the period of tightening and loosening) and thus the transmission is converted to a direct transmission with transmission ratio 1:1. In this case the reaction member does not need to be stopped during the tightening and loosening.

Instead of temporary coupling the members of the transmission for the period of tightening and loosening, some members of the transmission can be constantly coupled by means of a ratchet gearing. This ratchet gearing permits the transmission of the motion to the driven member with a speed increase transmission ratio when the reaction member is stopped and provides the possibility of transmitting the torque directly to the driven member with transmission ratio 1:1 when the reaction member is not stopped.

Under the expression "ratchet gearing" we mean all forms of this mechanism, including the frictional type, which may be used to transmit intermittent motion or to prevent relative motion between two parts except in one direction.

It should be noted that instead of preventing the motion of the reaction member of the transmission this reaction member may be driven as a second driving member of the tool. For instance: a wrench may have two handles, one of which is coupled with the input shaft of the transmission while the second handle is coupled with the housing of the transmission and the operator operates the both handles simultaneously.

An example of a wrench designed in accordance with the above described principles is shown in the accompanying drawings in which.

Figure 1:
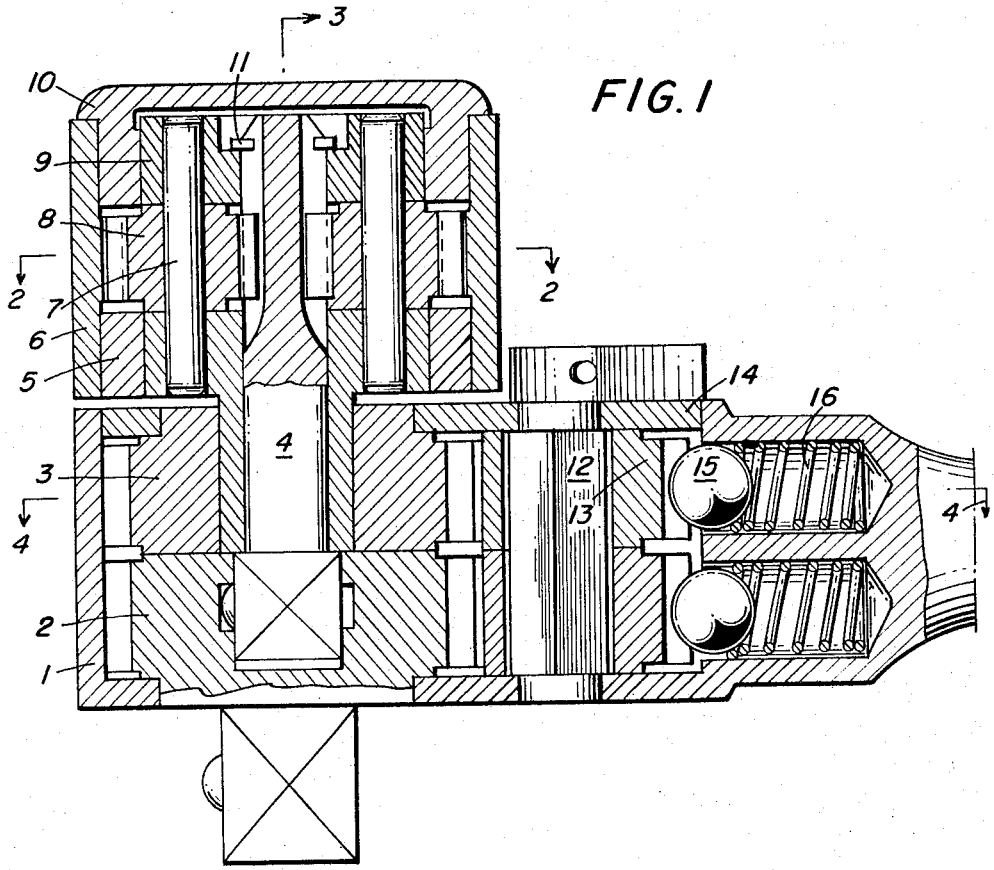
FIGURE 1 is a vertical section view taken substantially through the axis of the transmission mechanism and through the center of the ratchet mechanism.
Figure 2:
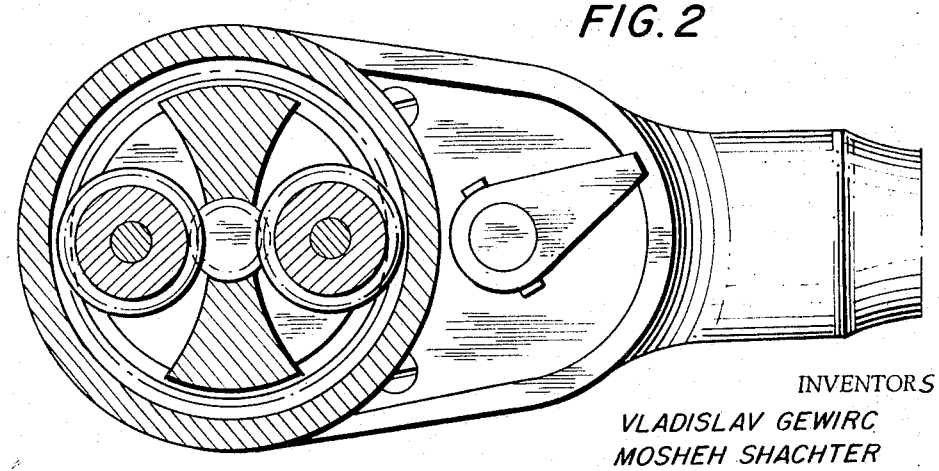
FIGURE 2 is a section through the planetary gearing along line C—C of FIGURE 1.
Figure 3:
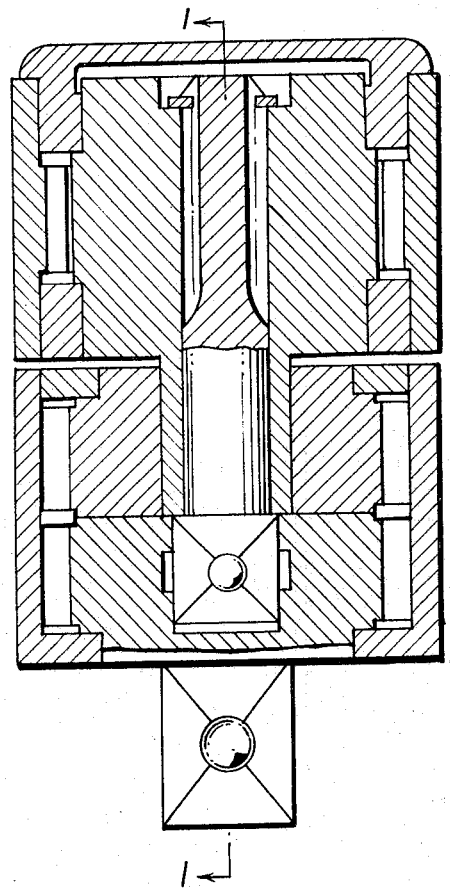
FIGURE 3 is a vertical section through the mechanism along line B—B of FIGURE 1.
Figure 4:
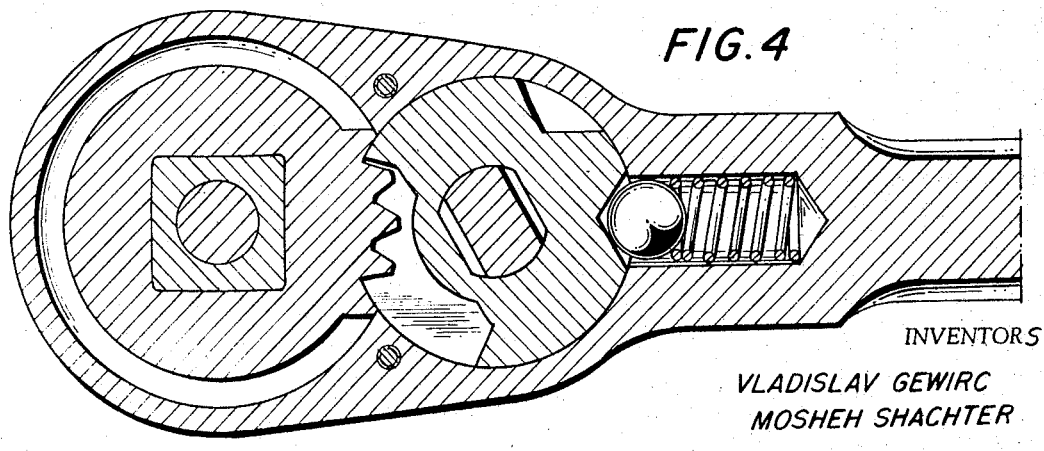
FIGURE 4 is a horizontal section through the ratchet mechanism along lines D—D of FIGURE 1.

One of the main parts of this wrench is a planetary gear transmission. The sun gear 4 and the satellite or planet carrier 9 with two satellites or planet gears 8 are placed inside of the housing 6.

The sun gear 4 is fixed in axial direction by means of a ring 11 and can rotate inside of the satellite or planet carrier 9 being engaged with the satellites or planet gears 8. The satellites or planet gears 8 can rotate on the axle 7 being engaged with the sun gear 4 and with the internal teeth cut in the inside surface of the housing 6. The satellite or planet carrier 9 can rotate in the bearings 5 and 10. The head of the wrench 1 comprises two reversible ratchet gearings. The ratchet 3 is coupled with the satellite or planet carrier 9. The ratchet 2 is coupled with the sun gear 4. The balls 15 and the springs 16 provide the engagement of the pawls 13 with the ratchets 2 and 3. The reverse of the ratchet gearings is realized simultaneously for both ratchets by turning the pin 12. The satellite or planet carrier 9 is the input member of the transmission.

The sun gear 4 is the output member of the transmission.

The housing 6 is the reaction member of the transmission.

During the period of running the fastener the operator prevents the rotation of the housing 6 by means of a grip. In this case, thanks to the kinematic relations in the transmission, the ratchet 2 rotates in the same direction but with a greater speed than the ratchet 3. Thus the fast running of the fastener is realized.

In order to realize the tightening or the loosening, the operator ceases the grip. Thanks to this, the housing 6 moves together with the other members of the transmission and there is no relative motion in it. The both ratchets move with the same speed. In this case the transmission has no influence on the work and the torque which the operator produces is transmitted directly to the ratchet 2 while the ratchet 3 and the members of the transmission remain unloaded.

Thanks to the fact that the transmission takes no part in tightening and loosening, the size of the transmission is small.

It is obvious that a screwdriver can be designed according to the same or similar principles as the above described wrench. It should be noted that, thanks to the fact that the running of the fastener is realized with great speed, a certain amount of kinetic energy is stored in the rotating parts of the tool during the period of running.

Thanks to this, the tightening of the fastener can be fully or partly realized by means of an impact of the rotating parts. In order to increase the impact effect a flywheel can be applied.

What we claim is:

A wrench comprising an elongated handle having an opening at one end, two coaxial ratchet members mounted in said opening, ratchet pawls pivotally mounted in said elongated handle adjacent said ratchet members for engagement therewith, control means for selectively pivoting the ratchet pawls into engagement with the ratchet members; and a planetary transmission mounted coaxially with the ratchet members comprising a housing, a sun gear whose axis of rotation coincides with that of the ratchet members and which is operatively connected to one of said ratchet members, at least two rotatably mounted planet-gears in meshing engagement with the sun gear and with an internal ring gear which is integral with said housing, and a planet carrier for mounting said planet-gears which is operatively connected to the other of said ratchet members.

References Cited by the Examiner
UNITED STATES PATENTS

| | | | |
|---|---|---|---|
| 1,991,766 | 2/1935 | Matveyeff | 145—75 |
| 2,092,598 | 9/1937 | Blair | 81—57 X |
| 2,510,483 | 6/1950 | Schnepel et al. | 81—57 X |
| 2,634,630 | 4/1953 | Johnson | 81—57 X |
| 2,721,591 | 10/1955 | Criswell | 81—57 X |

FRED C. MATTERN, JR., *Primary Examiner.*

BROUGHTON G. DURHAM, J. A. MARSHALL, F. E. BAKER, *Examiners.*